(12) United States Patent
Breiner

(10) Patent No.: US 8,154,393 B2
(45) Date of Patent: *Apr. 10, 2012

(54) VEHICULAR SYSTEM HAVING A WARNING SYSTEM TO ALERT MOTORISTS THAT A MOBILE PHONE IS IN USE

(76) Inventor: Sheldon Breiner, Portola Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/387,254

(22) Filed: Apr. 29, 2009

(65) Prior Publication Data

US 2010/0134266 A1      Jun. 3, 2010

Related U.S. Application Data

(63) Continuation of application No. 10/206,247, filed on Jul. 26, 2002, now Pat. No. 7,541,914.

(60) Provisional application No. 60/351,743, filed on Jan. 24, 2002.

(51) Int. Cl.
*B60Q 1/00*           (2006.01)

(52) U.S. Cl. ................... 340/425.5; 340/439; 340/468

(58) Field of Classification Search ............... 340/425.5, 340/439, 468, 438; 455/1, 422, 517, 67.7
See application file for complete search history.

(56) References Cited

U.S. PATENT DOCUMENTS

| | | | |
|---|---|---|---|
| 5,566,224 A | 10/1996 | Azam et al. | 379/58 |
| 5,714,930 A | 2/1998 | McKinney | 340/468 |
| 6,225,897 B1 | 5/2001 | Doyle et al. | 340/468 |
| 6,262,657 B1 | 7/2001 | Okuda et al. | 340/439 |
| 6,353,778 B1 | 3/2002 | Brown | 701/1 |
| 7,541,914 B2 * | 6/2009 | Breiner | 340/425.5 |

* cited by examiner

*Primary Examiner* — Brent Swarthout
(74) *Attorney, Agent, or Firm* — T. H. P. Richardson

(57) ABSTRACT

This invention relates to a warning system for use on board a motorized road vehicle. The warning system includes an activity detector that detects an RF signal emitted from a mobile phone when a person driving the motorized vehicle is communicating over the mobile phone. The warning system also has a display device in communication with the activity detector, the display device providing a visual indication to a motorist of another vehicle near the motorized vehicle in traffic, in a manner that allows the motorist of the other vehicle to ascertain when the person driving the motorized vehicle is using the mobile phone.

18 Claims, 3 Drawing Sheets

Vehicular System 10

Vehicular System 42

VEHICULAR SYSTEM HAVING A WARNING SYSTEM TO ALERT MOTORISTS THAT A MOBILE PHONE IS IN USE

CROSS-REFERENCE TO RELATED APPLICATIONS

Priority is claimed from U.S. provisional patent application No. 60/351,743, filed on Jan. 24, 2002 and this application is a continuation of application Ser. No. 10/206,247 filed Jul. 26, 2002, now U.S. Pat. No. 7,541,914.

BACKGROUND OF THE INVENTION

1). Field of the Invention

This invention relates generally to a vehicular system, and more specifically to a vehicular system having a warning system on board, which is used to warn drivers that the motorist of another vehicle is actively engaged in the use of a mobile phone and thus not able to pay full attention to the duties of driving.

2). Discussion of Related Art

Cellular phones and other mobile phones have become ubiquitous. Almost one billion people in many countries have come to depend upon mobile phones, and use them in all aspects of their daily lives, including while driving their cars.

Talking on a mobile phone while driving is, in many ways, similar to driving while intoxicated, because one's full attention is not directed to the task of driving safely. Many accidents have been attributed to this unsafe, but popular activity. In many of these accidents, it is persons in another vehicle that are the victims. When a driver is speaking on a mobile phone, it is difficult to concentrate on the normal tasks of driving, such as maneuvering, avoiding obstacles, changing lanes, or even turning. Normal preventive actions that avoid collisions are unlikely to be performed well, and can result in accidents involving nearby cars.

Several features exist in modern vehicles which allow a vehicle driver to signal to others on the road a driver's intentions to perform an action that might affect others' safety or traffic flow. Turn signals tell other drivers that one intends to turn shortly and in what direction. Brake lights tell a driver behind a vehicle of the vehicle driver's intention to stop.

Studies of the use of the high center-mounted stop lights have shown that the extra warning given to other motorists of a motorist's intention to stop has resulted in the prevention of accidents.

Many drivers already drive with extreme caution when a driver is spotted holding a mobile phone while driving. In some countries and in the State of New York, it is required that drivers have a hands-free mobile phone installation; however, it would then be virtually impossible to recognize from another vehicle who is on a phone and who is not.

SUMMARY OF THE INVENTION

This invention relates to a warning system for use on board a motorized road vehicle. The warning system includes an activity detector that detects a signal emitted from a mobile phone when a person driving the motorized vehicle is communicating over the mobile phone. The signal may, for example, be an RF signal or an electrical signal. The warning system also has a display device in communication with the activity detector, the display device providing a visual indication to a motorist of another vehicle near the motorized vehicle in traffic, in a manner that allows the motorist of the other vehicle to ascertain when the person driving the motorized vehicle is using the mobile phone.

It is possible to anticipate such unannounced and possibly dangerous maneuvers by the mobile-phone-engaged motorist if such motorist gave a signal or warning that he or she is engaged in a mobile phone conversation. However, because the mobile-phone-engaged motorist is already engaged in at least one distracting activity, the mobile-phone-engaged motorist cannot, or should not, have the burden himself or herself of activating such a warning system. It would therefore be a beneficial safety measure if an automatic warning were given to all other nearby motorists that a given driver is, by definition, engaged in a potentially distracting activity while driving.

To address this need, therefore, a system is proposed to present to others on the road a signal that someone in the vehicle is using a mobile phone and to do so automatically, regardless of whether the mobile phone is handheld or hands-free. This system automatically detects when a local mobile phone is in used and then activates an external signal as a warning to others that the motorist in the vehicle is engaged in a mobile phone conversation and not capable of paying full attention to the actions and responsibilities of a motorist.

BRIEF DESCRIPTION OF THE DRAWINGS

The invention is further illustrated by way of example with reference to the accompanying drawings, wherein.

DETAILED DESCRIPTION OF THE INVENTION

Figure 1:
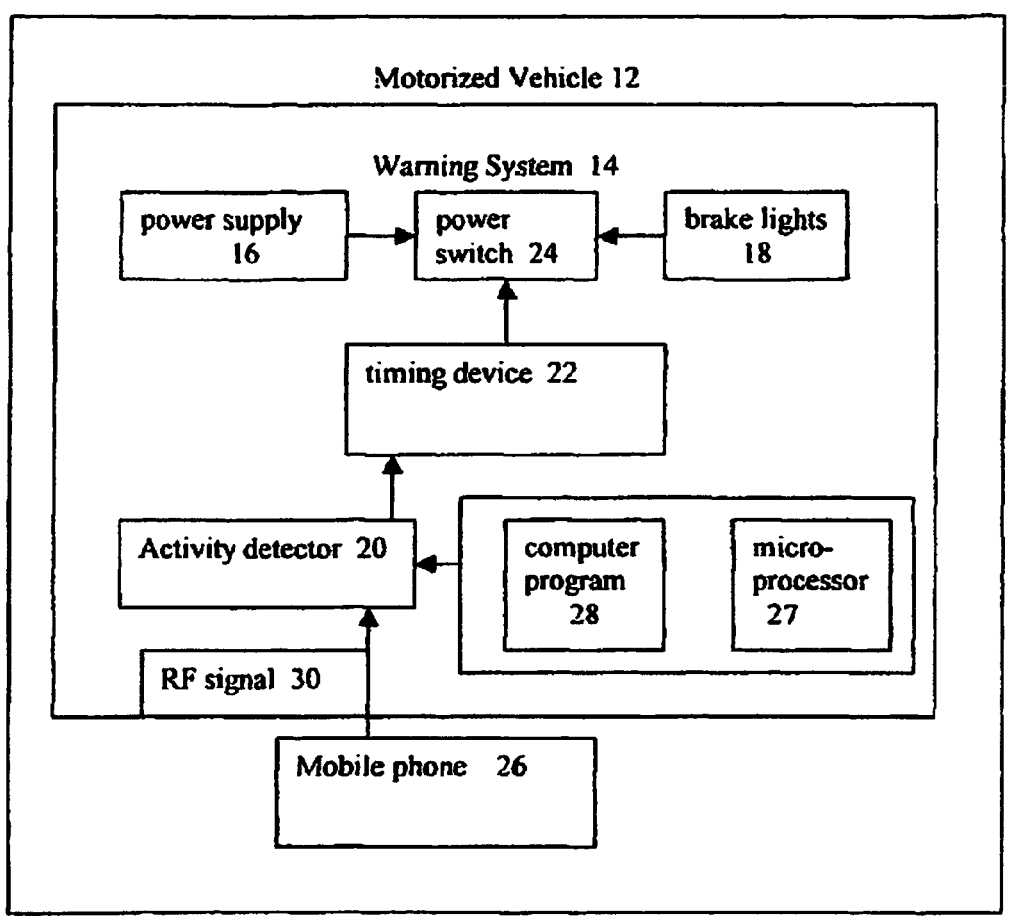
FIG. 1 is a block diagram illustrating a vehicular system according to an embodiment of the invention, having a warning system to warn other vehicles in traffic that a person operating the vehicular system is communicating over a mobile phone.

FIG. 1 of the accompanying drawings illustrates a vehicular system 10, according to an embodiment of the invention, including a motorized vehicle 12 and a warning system 14.

The motorized vehicle 12 may be any road vehicle, such as a motor car, a truck, or a motorcycle. As is commonly understood, the motorized vehicle 12 has a wheeled chassis and an internal combustion engine which drives the wheeled chassis forward over a surface, or may be an electric or hybrid vehicle. The motorized vehicle 12 further has a seat in which or on which a person can sit for purposes of driving the motorized vehicle 12. The motorized vehicle 12 further has a steering mechanism and other controls, such an accelerator or a brake control, that are all under the control of the person driving the motorized vehicle 12.

A DC power supply 16 and brake lights 18 of the motorized vehicle 12 form part of the warning system 14. The warning system 14 further includes an activity detector 20, a timing device 22, and a power switch 24.

The purpose of the warning system 14 is to warn motorists of other vehicles in traffic when the person driving the motorized vehicle is communicating over a mobile phone 26. No radio frequency (RF) signal is transmitted from the mobile phone 26 when the mobile phone 26 is switched off. When the mobile phone 26 is switched on in standby mode, that is, monitoring a possible call to be received but not being used for voice transmission, the normal mode of operation of many mobile phones may cause an RF signal to be briefly transmitted to tell the network that the phone is on and ready to receive or transmit.

When the phone user then places or receives a call, the mobile phone is then is transmit/receive mode and an RF signal 30 is then transmitted by the mobile phone 26. The primary purpose of the RF signal 30 is to transmit voice data signals to a remote location distant from the vehicular system 10, such as a cellular phone network. The RF signal 30 is also detected by the activity detector 20. The activity detector 20 thus detects when the mobile phone 26 is transmitting/receiving or on standby/off. The activity detector 20 has a sensitivity that is set so that only an RF signal that is transmitted by the mobile phone 26 is detected, and RF signals transmitted from mobile phones or transmitting stations outside the motorized vehicle 12 are not detected.

The timing device 22 is activated by the activity detector 20 when the activity detector 20 detects that the mobile phone 26 is switched on and in transmit/receive mode. The timing device 22 is switched off by the activity detector 20 when the mobile phone 26 is no longer in transmit/receive mode. A microprocessor 27 may have a computer program 28 to assist the activity detector 20 in discriminating between signals. The activity detector 20 detects when the mobile phone 26 is in transmit/receive mode and controls other functions of the warning system. The activity detector 20 employs a microprocessor 27 and a computer program 28. The activity detector 20 detects when the phone is being used to transmit/receive by discriminating against transient, standby-mode mobile phone RF signals from the longer-term RF signals when in transmit/receive mode. If a special-purpose signal is not present in the phone, the transmitted RF energy is detected with a signal strength sensitivity threshold that is set so that only an RF signal that is transmitted by a nearby mobile phone 26 is detected, and RF signals more distant and transmitted from mobile phones inside other vehicles outside the motorized vehicle 12 are not detected. It sets the highest threshold of the detectable RF signal. The activity detector logic directs the nature of the RF energy to respond to the different means of RF transmission used in the various industry-standard mobile phone systems such as TDMA, CDMA, GSM, PCS, 3G, 2.5G, and others. The logic in the activity detector 20 allows the brake lights to turn on in a steady, non-blinking fashion when the brake pedal is depressed by allowing the depression of the brake pedal to override the warning system.

The power switch 24, in turn, is connected to the timing device 22. The timing device 22 can, for example, switch the power switch 24 on at intervals of two seconds, the power switch 24 being switched on for one second in every period of two seconds. The timing device 22 alternately switches the power switch 24 on and off, only when the mobile phone 26 is in transmit/receive mode, and the power switch 24 is switched off when the mobile phone 26 is no longer in transmit/receive mode.

The brake lights 18 are connected through the power switch 24 to the power supply 16. Power is provided through the power switch 24 to the brake lights 18 when the power switch 24 is switched on, and the brake lights 18 are switched off when the power switch 24 is switched off. It can thus be seen that the brake lights 18 are alternately switched on and off when the mobile phone 26 is in transmit/receive mode. When the mobile phone 26 is not in transmit/receive mode, the brake lights 18 are switched off. When the mobile phone 26 is not in transmit/receive mode, the brake lights 18 can only be switched on when the person operating the motorized vehicle 12 operates a brake control, such as foot brake, to decelerate the motorized vehicle 12. The brake lights 18 will thus provide a steady light signal whenever a brake control is operated by the person operating the motorized vehicle 12.

Instead of the brake light as the visual warning signal, it is possible to employ the high center-mounted stop light and the parking lights or a special warning light or lights. The mode might be a steady light instead of blinking. An audible warning signal, in addition to or instead of lights, can also be considered.

Figure 2:
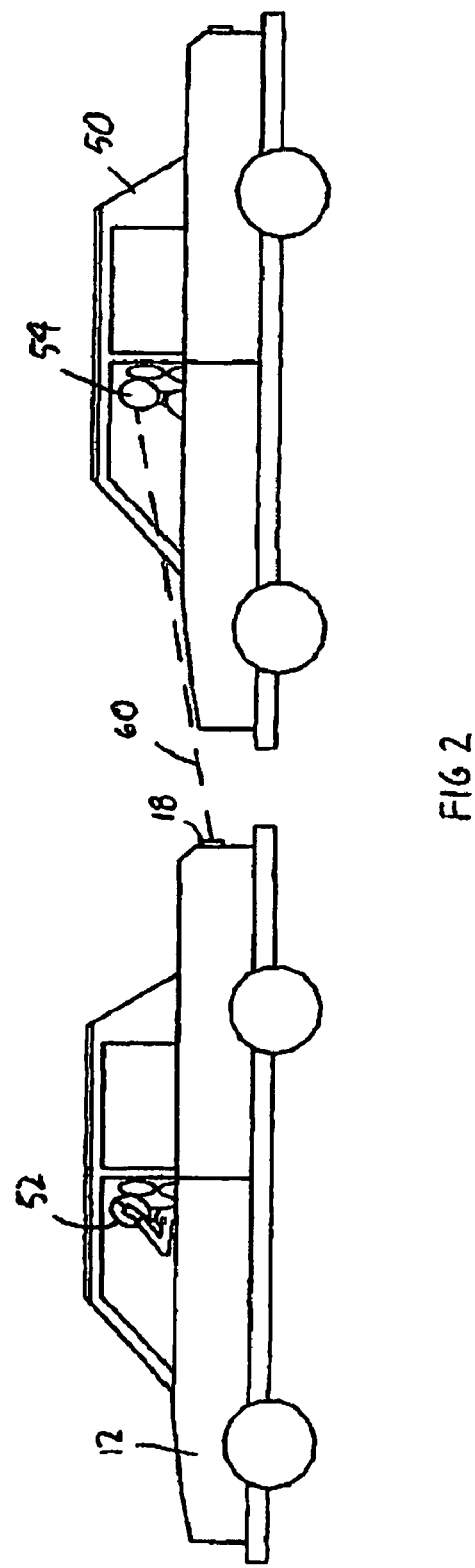
FIG. 2 is a side view illustrating two vehicles, a first of the vehicles having a warning system on board which is used to warn a motorist of the second vehicle that the person driving the first vehicle is using a mobile phone.

FIG. 2 illustrates a motorized vehicle 12 in the form of a motor car, together with another motorized vehicle 50 in traffic. The motorized vehicle 12 is driven by a person 52, while the motorized vehicle 50 is driven by a motorist 54 and is behind the motorized vehicle 12. The brake lights 18 of the motorized vehicle 12 provide an alternating light signal 60 that shines from the brake lights 18 through a window of the motorized vehicle 50. The signal 60 provides a visual indication to the motorist 54 that the person 52 is using a mobile phone. The motorist 54 can discern from a blinking or flashing nature of the signal 60 that the person 52 is using a mobile phone, whereas a constant signal would indicate that the person 52 is operating a foot brake to decelerate the motorized vehicle 12.

The two-second period or other appropriate duty cycle at which the brake lights 18 are switched on and off is sufficiently long to be perceptible by a person, yet sufficiently short so that a person can discriminate between a normal, constant brake light used when operating the foot brake, and a signal that indicates that the mobile is in use.

The motorist 54, knowing that the person 52 may pose a danger on the road, can now take preventive action to avoid a possible collision between the vehicles 12 and 50. Such preventive action may, for example, be decelerating the vehicle 50. Other vehicles in the traffic to the left, the right, or in front of the motorized vehicle 12 do not see the signal 60, and continue to drive normally.

Figure 3:
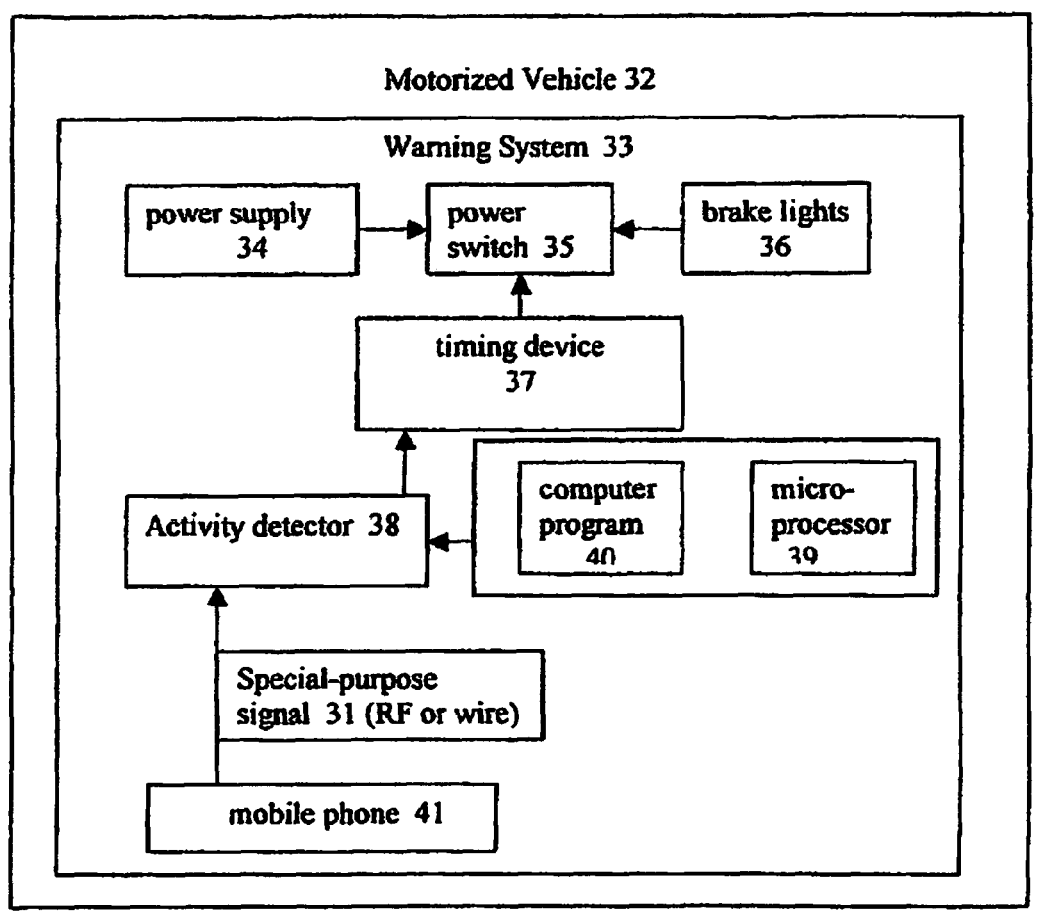
FIG. 3 is a block diagram illustrating a vehicular system according tot another embodiment of the invention, having a mobile phone that transmits a special-purpose signal indicating that a person operating the vehicular system is communicating over a mobile phone.

In another embodiment, illustrated in FIG. 3, a warning system 33 utilizes a special-purpose signal 31 generated by the mobile phone 41 for the principal purpose of signaling the warning system 33. Whereas the primary purpose of the RF signal used is to transmit/receive signals to a remote location, the special-purpose signal is intended primarily to actuate the warning system 33. This special-purpose signal 31 can be an RF signal or a direct, wire-conducted current. A special-purpose signal would be used if such signal better assures confirmation of the transmit/receive mode, for example in CDMA transmission, or if the special-purpose signal results in simpler deployment or lower cost of the warning system. In this embodiment utilizing a special-purpose signal, the warning system 33 would include the mobile phone 41 within the warning system 33. Other components, such as the microprocessor 39, computer program 40, power supply 34, etc., are the same as in FIG. 1.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

I claim:

1. A warning system suitable for installation in a motorized road vehicle, the system comprising
   (1) an activity detector which, when it is placed in the vicinity of a mobile telephone which
      (i) when it is in a standby mode, generates RF signals of a first, transient, type,
      (ii) when it is being used in a communication mode, generates RF signals of a second, longer term, type, and
      (iii) does not generate any special RF signal for the purpose of activating a warning system,
   (a) automatically detects RF signals of the first or second type, (b) discriminates between RF signals of the first type and RF signals of the second type, (c) is activated when it detects RF signals of the second type, and (d) is not activated when it detects signals of the first type;
   and which, when it is in the vehicle, has a sensitivity such that it does not detect RF signals from mobile telephones outside the vehicle or, RF signals from transmitting stations transmitting to mobile telephones outside the vehicle; and
   (2) a display device which
      (i) is switched on by the activity detector while the activity detector is detecting RF signals of the second type, and is not switched on while the activity detector is detecting only RF signals of the first type, and
      (ii) when it is switched on, displays a visible warning signal.

2. A warning system according to claim 1 which is suitable for connection to a DC power supply of a motorized vehicle.

3. A warning system according to claim 1 which is installed in a motorized road vehicle.

4. A warning system for a motorized road vehicle, the system comprising
   (1) a mobile telephone which
      (i) when it is in a standby mode within the vehicle, generates RF signals of a first, transient, type,
      (ii) when it is being used by a motorist within the vehicle in a communication mode, generates RF signals of a a second, longer term, type, and
      (iii) does not generate any special RF signal for the purpose of activating a warning system,
   (2) an activity detector which (a) automatically detects RF signals of the first or second type, (b) discriminates between RF signals of the first type and RF signals of the second type, (c) is activated when it detects RF signals of the second type, and (d) is not activated when it detects signals of the first type;
   and which, when it is in the vehicle, has a sensitivity such that it does not detect RF signals from mobile telephones outside the vehicle or RF signals from transmitting stations transmitting to mobile telephones outside the vehicle: and
   (3) a display device which
      (i) is switched on by the activity detector while the activity detector is detecting RF signals of the second type, and is not switched on while the activity detector is detecting RF signals of the first type, and
      (ii) when it is switched on, displays a visible warning signal.

5. A warning system according to claim 4 wherein the warning signal is visible to other motorists.

6. A warning system according to claim 4 wherein the activity detector sets a threshold for the RF signal strength which it will detect.

7. A warning system according to claim 4 wherein the warning signal is displayed only on the rear of the vehicle.

8. A warning system according to claim 4 wherein the warning signal comprises switching the brake lights of the vehicle on and off.

9. A warning system according to claim 4 wherein the warning signal comprises at least one separate light.

10. A warning system according to claim 4 wherein the motorized vehicle includes a DC power supply which powers the activity detector and the display device.

11. A warning system according to claim 4 wherein the mobile telephone uses a system selected from TDMA and GSM.

12. A motorized road vehicle having a warning system which comprises
   (1) a DC power supply which is part of the vehicle;
   (2) an activity detector which
      (i) is powered by the DC power supply,
      (ii) when there is a mobile telephone within the vehicle, said mobile telephone
         (a) when it is in a standby mode within the vehicle, generating RF signals of a first, transient, type,
         (b) when it is being used by a motorist within the vehicle in a communication mode, generating RF signals of a second, longer term, type, and
         (c) not generating any special RF signal for the purpose of activating a warning system,
      automatically detects the RF signals of the first or second type, and discriminates between the RF signals of the first type and the RF signals of the second type, and
      (iii) has a sensitivity such that it does not detect RF signals from mobile telephones outside the vehicle or RF signals from transmitting stations transmitting to mobile telephones outside the vehicle; and
   (3) a display device which
      (i) is switched on by the activity detector while the activity detector is detecting RF signals of the second type, and is not switched on while the activity detector is detecting RF signals of the first type, and
      (ii) when it is switched on, displays a visible warning signal.

13. A vehicle according to claim 12 wherein the visible warning signal is on the rear of the vehicle and is visible to other motorists.

14. A vehicle according to claim 12 which contains a said mobile telephone.

15. A vehicle according to claim 14 wherein the mobile telephone uses a system selected from TDMA and GSM.

16. A vehicle according to claim 12 wherein the warning system includes a timing device such that brake lights on the vehicle are switched on and off as the visible warning signal.

17. A vehicle according to claim 12 wherein the visible warning signal comprises at least one separate light.

18. A vehicle according to claim 12 wherein the activity detector sets a threshold for the RF signal strength which it will detect.

* * * * *